United States Patent
Bae et al.

(10) Patent No.: US 11,783,538 B2
(45) Date of Patent: Oct. 10, 2023

(54) THREE DIMENSIONAL IMAGE GENERATING METHOD AND APPARATUS

(71) Applicant: KOREA ADVANCED INSTITUTE OF SCIENCE AND TECHNOLOGY, Daejeon (KR)

(72) Inventors: Hyeon-Min Bae, Daejeon (KR); Gunpil Hwang, Daejeon (KR); Seohyeon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 662 days.

(21) Appl. No.: 16/837,036

(22) Filed: Apr. 1, 2020

(65) Prior Publication Data
US 2020/0334898 A1 Oct. 22, 2020

(30) Foreign Application Priority Data
Apr. 19, 2019 (KR) .......................... 10-2019-0046134

(51) Int. Cl.
*G06T 17/00* (2006.01)
*G06F 17/15* (2006.01)
*G06T 13/20* (2011.01)

(52) U.S. Cl.
CPC ............. *G06T 17/00* (2013.01); *G06F 17/15* (2013.01); *G06T 13/205* (2013.01); *G06T 2207/10136* (2013.01); *G06T 2207/20056* (2013.01)

(58) Field of Classification Search
CPC .................. G06T 17/00; G06T 13/205; G06T 2207/10136; G06T 2207/20056; G06F 17/15
See application file for complete search history.

(56) References Cited

U.S. PATENT DOCUMENTS

| | | | |
|---|---|---|---|
| RE34,566 E * | 3/1994 | Ledley | .................. H04N 13/275 600/443 |
| 5,430,690 A * | 7/1995 | Abel | ....................... G01R 23/16 367/136 |
| 5,737,485 A * | 4/1998 | Flanagan | ................ G10L 15/16 704/E15.017 |
| 6,438,071 B1 * | 8/2002 | Hansen | .................... G01S 15/89 367/88 |

(Continued)

FOREIGN PATENT DOCUMENTS

| EP | 2010939 B1 * | 3/2010 | ............... A61B 8/12 |
|---|---|---|---|
| JP | 2001-187055 | 7/2001 | |

(Continued)

OTHER PUBLICATIONS

Chen, 2007, IEEE Publication, "Joint Time-Frequency Analysis for Radar Signal and Imaging" (pp. 5166-5169). (Year: 2007).*

(Continued)

*Primary Examiner* — Manav Seth
(74) *Attorney, Agent, or Firm* — LEX IP MEISTER, PLLC

(57) ABSTRACT

There is provided a 3D image generation method and apparatus. A 3D image generation method according to an embodiment includes outputting a signal to an object from at least one point, receiving the signal reflected by the object at one or more points, and generating a 3D image of the object based on a temporal feature and a spectral feature of the signal reflected by the object.

22 Claims, 14 Drawing Sheets

(56) References Cited

U.S. PATENT DOCUMENTS

| | | | | |
|---|---|---|---|---|
| 6,532,821 | B2* | 3/2003 | Lamouche | G01N 29/4418 |
| | | | | 73/659 |
| 7,606,114 | B2* | 10/2009 | Bachelor | G01S 15/89 |
| | | | | 367/138 |
| 7,957,224 | B2 | 6/2011 | Tremper | |
| 8,900,145 | B2* | 12/2014 | Curra | A61B 8/5223 |
| | | | | 601/3 |
| 8,964,507 | B2* | 2/2015 | Bachelor | G10K 11/343 |
| | | | | 367/103 |
| 9,218,690 | B2 | 12/2015 | Buehler et al. | |
| 9,716,001 | B2* | 7/2017 | Xu | H01J 49/005 |
| 10,335,572 | B1* | 7/2019 | Kumar | G06F 3/016 |
| 10,380,399 | B2* | 8/2019 | Call | G01S 15/8918 |
| 10,403,269 | B2* | 9/2019 | Sainath | G06N 3/045 |
| 10,528,147 | B2* | 1/2020 | Tashev | A61K 8/97 |
| 11,262,287 | B2* | 3/2022 | Park | G01N 21/85 |
| 11,506,776 | B2* | 11/2022 | Cho | G01S 13/9047 |
| 2006/0052699 | A1* | 3/2006 | Angelsen | G01S 7/52042 |
| | | | | 600/437 |
| 2007/0159922 | A1* | 7/2007 | Zimmerman | G01S 15/86 |
| | | | | 367/103 |
| 2011/0222372 | A1* | 9/2011 | O'Donovan | G01S 3/8083 |
| | | | | 367/103 |
| 2014/0180097 | A1* | 6/2014 | Rothberg | A61B 8/4254 |
| | | | | 600/438 |
| 2017/0300124 | A1 | 10/2017 | Tashev et al. | |
| 2022/0299603 | A1* | 9/2022 | McMahon | G01S 7/415 |
| 2023/0016600 | A1* | 1/2023 | Jarrahi | G01N 21/3586 |

FOREIGN PATENT DOCUMENTS

| | | | | |
|---|---|---|---|---|
| JP | 2008-500541 | | 1/2008 | |
| JP | 2014-049127 | | 3/2014 | |
| JP | 2018-189611 | | 11/2018 | |
| KR | 10-2015-0013974 | | 2/2015 | |
| WO | WO-2005008272 | A2* | 1/2005 | G01S 15/89 |
| WO | WO-2005047930 | A1* | 5/2005 | G01S 15/89 |
| WO | WO-2016178235 | A1* | 11/2016 | G01B 15/04 |

OTHER PUBLICATIONS

Zhang et al., "Acoustic time-frequency domain imaging" (pp. EL323-EL328). (Year: 2010).*

Murino et al., "Three-Dimensional Image Generation and Processing in Underwater Acoustic Vision" (pp. 1903-1946) (Year: 2000).*

Seo et al., "Drone Detection Using Convolutional Neural Networks with Acoustic STFT Features" (pp. 1-6) (Year: 2018).*

Palmese et al., "Three-Dimensional Acoustic Imaging by Chirp Zeta Transform Digital Beamforming" (pp. 2080-2086). (Year: 2009).*

Minoshima et al., "Simultaenous 3-D imaging Using Chirped Ultrashort Optical Pulses" (pp. 1348-1351) (Year: 1994).*

Saillant et al; "A computational model of echo processing and acoustic imaging in frequency-modulated echolocating bats: The spectrogram correlation and transformation receiver" (pp. 2691-2712) (Year: 1992).*

Watanabe, Sumio et al., "An ultrasonic visual sensor for three-dimensional object recognition using neural networks." IEEE transactions on Robotics and Automation, 1992, 8.2: 240-249.

Gunpil Hwang et al., "Bat-G net: Bat-inspired High-Resolution 3D Image Reconstruction using Ultrasonic Echoes", Korea Advanced Institute of Science and Technology (KAIST), 2019.

* cited by examiner

Long window STFT    Short window STFT

THREE DIMENSIONAL IMAGE GENERATING METHOD AND APPARATUS

CROSS-REFERENCE TO RELATED APPLICATION

This application claims the benefit of Korean Patent Application No. 10-2019-0046134, filed on Apr. 19, 2019, in the Korean Intellectual Property Office, the disclosure of which is incorporated herein by reference.

BACKGROUND

(a) Field

The embodiments described below relate to a three-dimensional (hereinafter refer to as "3D") image generation method and apparatus.

(b) Description of the Related Art

Presently, autonomous driving remains at advanced driver assistance system (ADAS) level 2, where it is allowed to operate only in a highway or a clearly lane-separated road.

In order to reach level 4 where safe autonomous driving is possible even in the case that the driver cannot properly respond to a request to intervene in the control of the vehicle, and level 5 where human intervention is completely excluded, it is more important to accurately collect information about the surrounding objects and the environment in various environmental scenarios.

In a conventional unmanned system for autonomous driving, a RGB-Depth (RGB-D) camera, a light detection and ranging (Lidar), a radio detection and ranging (Radar), and an ultrasonic sensor are frequently used.

The RGB-D camera and the Lidar provide high resolution image information. In particular, the Lidar, which is most commonly used in an autonomous driving car, has a range of 100-120 m, an accuracy of ±2 cm, a horizontal resolution of 0.35°, and a vertical resolution of 0.4°. Meanwhile, the Lidar has a disadvantage in cost, since the price reaches to $30,000.

In addition, the RGB-D camera and the Lidar have a deadly flaw that the performance is remarkably degraded in the bad weather conditions such as darkness, snow, fog, rain or the like. On the other hand, the Radar and the ultrasonic sensor have almost no performance degradation due to weather, resulting in uniform and excellent performance in most environmental scenarios. The Radar has a resolution of a range of 350 m, an accuracy of 10 cm, and a resolution of about 1°, and thus the resolution of the Radar is lower than that of Lidar.

The ultrasonic sensor currently used in automobiles reads only the distance information from objects by measuring the time of flight (TOF), and has a limitation that only short distance up to 15 m can be measured due to attenuation in the air. Further, since the ultrasonic sensor transmits a single frequency pulse, the range-resolution that can be measured with cross-correlation is lower than in the case using a frequency-modulated pulse.

SUMMARY

The embodiments of the present disclosure may provide a 3D image generation technique using an artificial neural network.

According to an embodiment, a 3D image generation method may be provided. The 3D image generation method may include outputting a signal to an object from at least one point, receiving the signal reflected by the object at one or more points, and generating a 3D image of the object based on a temporal feature and a spectral feature of the signal reflected by the object.

Generating a 3D image of the object may include extracting a feature map including the temporal feature and the spectral feature from the reflected signal, and generating the 3D image of the object by processing the feature map.

Extracting a feature may include generating at least one spectrogram by producing time-frequency representation of the reflected signal, and extracting the feature map by processing the at least one spectrogram.

Generating at least one spectrogram may include generating at least one spectrogram by converting the signal reflected by the object based on at least one window.

Generating at least one spectrogram may include generating the at least one spectrogram by performing Fourier transform on the signal reflected by the object.

Extracting a feature map may include extracting at least one feature map including the temporal feature and the spectral feature by performing at least one convolution operation on the reflected signal, and combining the at least one feature map.

Combining the at least one feature map may include concatenating the at least one feature map, and performing a convolution operation on the concatenated at least one feature map.

Extracting the at least one feature map may further include sampling the reflected signal on which at least one convolution operation is performed.

The at least one convolution operation may include a convolution operation of which a size of a receptive field is variable.

Generating a 3D image by processing the feature map may include generating a vector by converting the feature map, and generating the 3D image by performing at least one convolution operation on the vector.

Outputting a signal to an object from at least one point may include outputting an ultrasonic chirp to the object.

Outputting the ultrasonic chirp may include outputting the ultrasonic chirp by controlling at least one of a length, linearity, a number of harmonic bands, and an output period of the ultrasonic chirp.

According to another embodiment, a 3D image generation apparatus may be provided. The 3D image generation apparatus may include a transmitter that outputs a signal to an object from at least one point, a receiver that receives the signal reflected by the object at one or more points, and a processor that generates a 3D image of the object based on a temporal feature and a spectral feature of the signal reflected by the object.

The processor may extract a feature map including the temporal feature and the spectral feature from the reflected signal, and generate the 3D image of the object by processing the feature map.

The processor may generate at least one spectrogram by producing time-frequency representation of the reflected signal, and extracts the feature map by processing the at least one spectrogram.

The processor may generate at least one spectrogram by converting the signal reflected by the object based on at least one window.

The processor may generate the at least one spectrogram by performing Fourier transform on the signal reflected by the object.

The processor may extract at least one feature map including the temporal feature and the spectral feature by performing at least one convolution operation on the reflected signal, and combines the at least one feature map.

The processor may concatenate the at least one feature map, and performs a convolution operation on the at least one concatenated feature map.

The processor may sample the reflected signal on which at least one convolution operation is performed.

The at least one convolution operation may include a convolution operation of which a size of a receptive field is variable.

The processor may generate a vector by converting the feature map, and generate the 3D image by performing at least one convolution operation on the vector.

The transmitter may output an ultrasonic chirp to the object.

The transmitter may output the ultrasonic chirp by controlling at least one of a length, linearity, a number of harmonic bands, and an output period of the ultrasonic chirp.

DETAILED DESCRIPTION OF THE EMBODIMENTS

Figure 1:
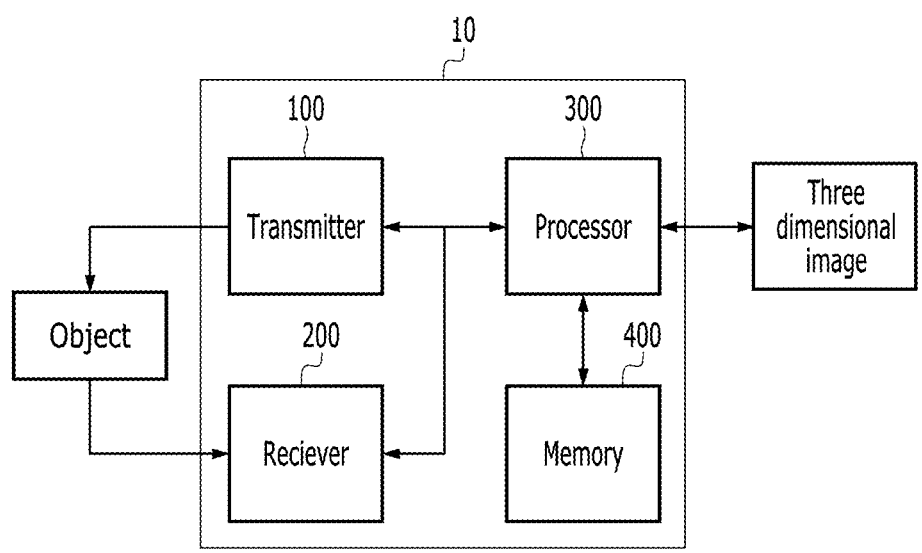
FIG. 1 shows a block diagram of 3D image generation apparatus according to an embodiment of the present disclosure.

Hereinafter, preferred embodiments of the present disclosure will be described with reference to the attached drawings. The present disclosure may, however, be embodied in many different forms and should not be construed as being limited to the embodiments set forth herein. It should be understood that the present disclosure covers all modifications, equivalents, and alternatives of the preferred embodiment of the present disclosure.

The terms used herein are for the purpose of describing the embodiment of the present disclosure and are not intended to limitation thereto. As used herein, the singular forms "a", "an" and "the" are intended to include the plural forms as well, unless the context clearly indicates otherwise. It will be further understood that the terms "comprise" or "comprising", "include" or "including", and "have" or "having" specify the presence of stated features, numbers, steps, operations, elements and/or component, but do not preclude the presence, addition or combination of one or more other features, numbers, steps, operations, elements and/or component.

It will be further understood that, although the terms first, second or the like may be used herein to describe various elements. These terms are only used to distinguish one element from another element. Thus, a first element, component, step or operation discussed below could be termed a second element, component, step or operation without departing from the teachings of the present inventive concept.

Unless otherwise defined, all terms (including technical and scientific terms) used herein have the same meaning as commonly understood by the person of ordinary skill in the art to which this disclosure belongs. Commonly used terms, such as those defined in dictionaries, should be interpreted to have meanings consistent with the meanings in the context of the related art, and should not be ideally or excessively interpreted unless otherwise defined herein.

In addition, in the following description with reference to the accompanying drawings, like reference numerals designate like elements throughout the specification and redundant description thereof will be omitted. Further, if it is determined that the detailed description of the well-known related art lead ambiguous interpretation of the present disclosure, the detailed description will be omitted.

FIG. 1 shows a block diagram of 3D image generation apparatus according to an embodiment of the present disclosure.

Referring to FIG. 1, a 3D image generation apparatus 10 may output a signal and receive a signal reflected by an object. The 3D image generation apparatus 10 may generate a 3D image by processing the received signal which is reflected by the object.

The object may include a target object of which a 3D image is to be generated. The object may include an object having a 3D shape.

The signal may refer to a function which represents an event in terms of physical quantities variable according to time and space. The signal may include a wave having any frequency. Further, the signal may include an electromagnetic wave and a sound wave. For example, the signal may include an ultrasonic chirp.

The 3D image may include an image comprising voxels in the form of a 3D vector. Also, the 3D image may include a two-dimensional image of which a pixel value includes depth information.

The 3D image generation apparatus 10 may generate a 3D image by processing a signal reflected by an object by using an artificial neural network. For example, the artificial neural network may include a convolutional neural network (CNN).

The 3D image generation apparatus 10 may provide a high resolution ultrasound 3D imaging system that emulates a bat, in consideration of the fact that the bat can recognize a 3D space. The 3D image generation apparatus 10 may generate a 3D image from a hyperbolic FM chirped ultrasonic echo.

The 3D image generation apparatus 10 may generate a 3D image by using the artificial neural network including an encoding network that emulates a central auditory pathway of the bat and a decoding network that performs 3D graphic visualization. The encoding network and the decoding network will be described in detail with reference to FIG. 5.

In order to train the artificial neural network, the 3D image generation apparatus 10 may use at least one spectrogram extracted from an ultrasound echo dataset of at least one channel and at least one 3D ground-truth image label per scan.

In order to obtain the ultrasound dataset, an automatic echo scanner circularly enclosing the object (or target object) with transceivers may be used. The automatic echo scanner may include a transceiver (or a camera synchronized with a transceiver), a video camera, a depth camera, and a Lidar.

While moving, the automatic echo scanner can measure moving or stationary objects and further can rotate around the objects. The transceiver will be described in detail with reference to FIG. 3.

The 3D image generation apparatus 10 may be implemented as an IoT device, a machine-type communication device, a portable electronic device, or the like.

The portable electronic device may be implemented as a laptop, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or a portable navigation device (PND), a handheld game console, an e-book reader, or a smart device. For example, the smart device may be implemented as a smart watch and a smart band.

The 3D image generation apparatus 10 may include a transmitter 100, a receiver 200, and a processor 300. The 3D image generation apparatus 10 may further include a memory 400.

The transmitter 100 may output a signal to an object from at least one position. The transmitter 100 may broadcast a signal to a position where a target to be measured is located. For example, the transmitter 100 may transmit an ultrasonic chirp to the object.

The transmitter 100 may include one signal generation device or a plurality of signal generation devices outputting a signal in response to the control of the processor 300. For example, the transmitter 100 may include a speaker located at one position or speakers located at a plurality of positions. In addition, the transmitter 100 may be implemented as an array of a plurality of speakers.

The transmitter 100 may output an ultrasonic chirp to the object. The transmitter 100 may output the ultrasonic chirp having controlled characteristics in response to the control of the processor 300. For example, the transmitter 100 may output the ultrasonic chirp of which at least one of a length, linearity, a number of harmonic bands, and an output period of the chirp is controlled. The characteristics of the ultrasonic chirp will be described in detail with reference to FIG. 2.

The receiver 200 may receive a reflected, refracted, scattered, and diffracted signal from the object. For example, the receiver 200 may receive the ultrasonic chirp reflected on the object. The receiver 200 may output the received signal to the processor 300.

The receiver 200 may receive signals reflected on the object at one or more positions. That is, the receiver 200 may be implemented as a signal receiving device located at a single point or a plurality of points. For example, the receiver 200 may include a microphone located at one point or microphones located at a plurality of points. In addition, the receiver 200 may be implemented as an array of a plurality of microphones.

The processor 300 may process data received by the receiver 200 and data stored in the memory 400. The processor 300 may execute computer-readable codes (e.g., software) stored in the memory 400 and instructions fetched by the processor 300.

The "processor 300" may be a data processing device implemented as a hardware including circuitry having a physical structure for performing desired operations. For example, the desired operations may include codes or instructions contained in a program.

For example, the data processing device implemented as a hardware may include a microprocessor, a central processing unit, a processor core, a multi-core processor, a multiprocessor, an application-specific integrated circuit (ASIC), and a field programmable gate array (FPGA).

The processor 300 may generate a 3D image of the object based on temporal features and spectral features of the signals reflected on the object.

The temporal feature of the signal may include a feature of the signal in the time domain. The temporal feature may include an amplitude (or a magnitude) and a phase of the signal in the time domain. For example, the temporal feature may include a pattern of a cue of the signal in the time domain.

The spectral feature of the signal may include a feature of the signal in the frequency domain. The spectral feature may include an amplitude (or a magnitude) and a phase of the signal in the time domain. For example, the spectral feature may comprise a pattern of a cue of the signal in the frequency domain.

The cue of the signal may include a notch and a null of the signal.

The processor 300 may extract a feature map including temporal features and spectral features based on the reflected signals. The processor 300 may generate a 3D image of the object by processing the extracted feature map.

In addition, the processor 300 may generate a 3D image by processing a spectrogram generated by converting the reflected signals. That is, the processor 300 may extract the feature map including temporal features and spectral features by processing the generated spectrogram.

The processor 300 may generate at least one spectrogram by producing time-frequency representation of the signals reflected by the object. For example, the spectrogram may include a first spectrogram and a second spectrogram.

The processor 300 may perform Fourier transform on the signals reflected by the object. The processor 300 may generate at least one spectrogram by performing Fourier transform on the signals reflected by the object. For example, the processor 300 may perform short-time Fourier transform (STFT) on the signals reflected by the object.

In detail, the processor 300 may generate at least one spectrogram by converting signals reflected by the object based on at least one window. For example, the window may include a first window and a second window.

The processor 300 may generate a first spectrogram by converting the signals reflected by the object based on the first window. The processor 300 may generate a second spectrogram by converting the signals reflected by the object based on the second window.

For example, the first window may be a long window, and the second window may be a short window. The window will be described in detail with reference to FIG. 4C.

The processor 300 may generate at least one spectrogram by performing STFT on the signals reflected by the object. For example, the processor 300 may generate a plurality of spectrograms by performing STFT on the signals reflected by the object based on the first window, and may generate the plurality of spectrograms by performing STFT on the signals reflected by the object based on the second window.

The processor 300 may extract a feature map including temporal features and spectral features from the reflected signals. Alternatively, the processor 300 may extract a feature map including temporal features and spectral features by processing the generated spectrograms.

For example, the processor 300 may extract at least one feature map including temporal features and spectral features by performing at least one convolution operation on the signals reflected by the object.

The convolution operation performed by the processor 300 may be an n-dimensional convolution operation. Here, n may be a natural number greater than or equal to 1. For example, the processor 300 may perform a two-dimensional convolution operation on the signals reflected by the object.

More specifically, the processor 300 may extract feature maps including temporal features and spectral features by performing at least one convolution operation on the reflected signal or the spectrogram via at least one encoding network.

The processor 300 may perform various operations on the signal reflected by the object, the spectrogram, and/or an intermediate feature map. The processor 300 may perform a convolution operation. The convolution operation may include convolution operations of various dimensions. In addition, the processor 300 may perform a convolution operation of which the size of a receptive field is variable. For example, the convolution operation of which a size of a receptive field is variable may include a deformable convolution operation.

After performing the convolution operation, the processor 300 may perform various operations required to achieve a training goal by reducing the final loss. For example, the operations performed by the processor 300 after the convolution operation may include a sampling operation, a batch normalization, and/or a dropout.

The sampling operation may include a pooling operation. Further, the pooling operations include a max pooling, an average pooling, a fractional max pooling, a fractional average pooling, a quantized max pooling, a quantized average pooling, a global max pooling, and a global average pooling.

The processor 300 may sample the reflected signals on which at least one convolution operation is performed. The processor 300 may sample the generated spectrogram.

For example, the processor 300 may perform the max pooling operation on the first spectrogram on which at least one convolution operation is performed. The processor 300 may perform the max pooling operation on the second spectrogram on which at least one convolution operation is performed.

The processor 300 may combine a plurality of spectral feature maps and a plurality of temporal feature maps. Specifically, the processor 300 may combine the plurality of spectral feature maps and the plurality of temporal feature maps by connecting the plurality of spectral feature maps and the plurality of temporal feature maps, and then performing a two-dimensional convolution operation thereon.

At least one convolution operation may include a convolution operation of which the receptive field is variable. For example, a convolution operation of which the receptive field is variable may include a deformable convolution operation. For example, the processor 300 may perform a convolution operation to which an offset is additionally applied.

The processor 300 may generate a 3D image of the object by processing the extracted temporal feature maps and spectral feature maps. The processor 300 may generate a vector by converting the temporal feature maps and the spectral feature maps. The processor 300 may generate a 3D image by performing at least one convolution operation on the vector.

The vector may include an m-dimensional vector. Here, m may be a natural number greater than or equal to 1. For example, the vector may include a 3D vector, and the convolution operation on the converted feature map may include a 3D convolution.

The memory 400 may include instructions (or programs) to be executed by the processor 300. For example, the instructions may include instructions for performing the operations of the processor 300 and/or the operations of each element of the processor 300.

The memory 400 may be implemented as a volatile memory device or a nonvolatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The nonvolatile memory device may be implemented as an electrically erasable programmable read-only memory (EEPROM), a flash memory, a magnetic RAM (MRAM), a spin-transfer torque-MRAM (STT-MRAM), and a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a holographic memory, a molecular electronic memory device, and an insulator resistance change memory.

Figure 2:
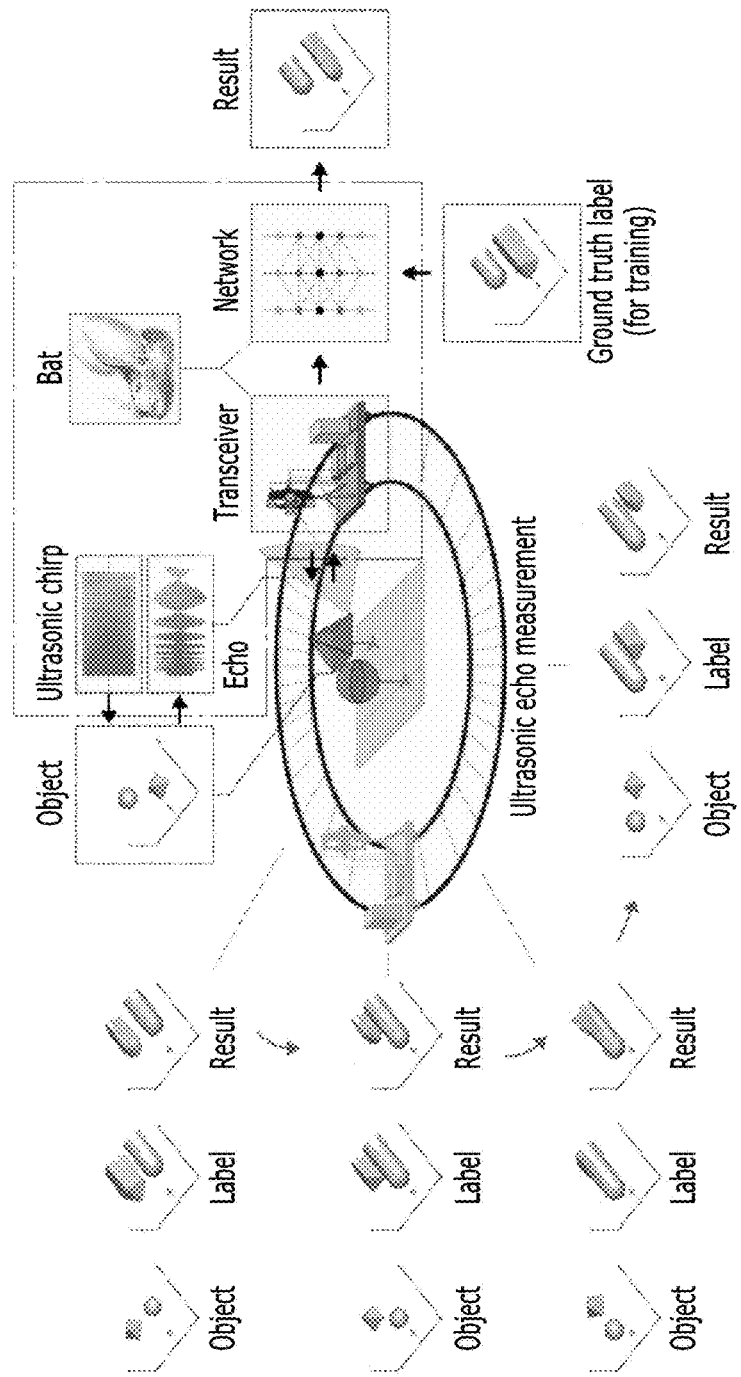
FIG. 2 shows an operation using the 3D image generation apparatus shown in FIG. 1.

FIG. 2 shows an operation using the dimensional image generating apparatus shown in FIG. 1.

Referring to FIG. 2, the 3D image generation apparatus 10 may generate a high resolution ultrasound 3D image by emulating echolocation mechanism of a bat. The bat can identify food and locations of obstacles by analyzing an echo of the emitted ultrasonic pulse. Such mechanism may be referred to as echolocation.

The echolocation may be an inverse problem of extracting spatial information of an object (or a target or a target object) from reflected and scattered echoes.

As described above, the transmitter 100 may output a signal from at least one point. For example, the transmitter 100 may output an ultrasonic chirp. The transmitter 100 may output an ultrasonic chirp similar to an ultrasonic chirp emitted by the bat.

The 3D image generation apparatus 10 may control the characteristics of the ultrasonic chirp which is output through the transmitter 100. The characteristics of the chirp may include a length of the chirp, linearity of the chirp, a number of harmonic bands of the chirp and an output period of the chirp.

The transmitter 100 may control the characteristics of the ultrasonic chirp in response to the control of the processor

300. The transmitter 100 may output an ultrasonic chirp of which at least one of the length, the linearity, the number of harmonic bands, and the output period is controlled.

When the length of the chirp is short, it may be suitable for precisely measuring a near-field object, with high scan rates. While the transmitter 100 outputs the chirp, the receiver 200 may not receive the chirp.

The processor 300 may not perform imaging during a time span corresponding to the length of the chirp output from the transmitter 100. The time span when the imaging is not performed may be referred to as a blind range. The shorter the chirp, the shorter the length of the blind range may become.

As the length of the chirp become shorter, the scan speed may increase. Since a chirp having a short length comprise small amount of low frequency component, far-field information may be relatively weakly received. Oppositely, a chirp having a long length may be suitable for measuring a far-field object.

The 3D image generation apparatus 10 may perform imaging for objects located in various distances by controlling the length of the chirp according to a given situation. For example, the 3D image generation apparatus 10 may perform imaging overall from a short distance to a long distance by increasing the length of the chirp, and may perform imaging by shortening the length of the chirp when an object to be measured in detail appears in short distance.

Further, the 3D image generation apparatus 10 may perform imaging by changing the length of the chirp periodically to adopt the advantages according to the length of the chirp.

The linearity of the chirp may include a degree of linearity and a degree of nonlinearity between time and frequency of the chirp signal.

The more hyperbolic and more nonlinear the chirp becomes, the more resistant to Doppler Effect the chirp becomes. Thus, the chirp becomes more suitable for identifying and imaging of a moving object. As the linearity of the chirp increases, frequency shift due to Doppler Effect increases. In such a case, the chirp may be unfavorable for imaging but be suitable for determining the speed of an object by using the degree of the frequency shift.

By controlling the linearity of the chirp, the 3D image generation apparatus 10 may transmit and receive a non-linear shaped chirp in order to perform imaging of an object and may transmit and receive a linear chirp in order to determine the speed of the object.

The 3D image generation apparatus 10 may control the number of harmonic bands of the chirp. As the number of harmonic bands of the chirp increases, it can get more suitable for high resolution imaging, since the correlation between the transmitted chirp and the received chirp gets higher and the resistance to Doppler Effect increases. However, the low output power of each frequency may be disadvantageous for long distance measurement.

The 3D image generation apparatus 10 may perform high resolution imaging by increasing the number of harmonic bands and perform high power, long distance imaging by reducing the number of harmonic bands.

The 3D image generation apparatus 10 may control the output period of the chirp. The scan rate (e.g., fps) and the scan range may be determined according to the output period of the chirp.

The 3D image generation apparatus 10 may perform imaging in real time on a fast moving object by increasing the scan rate through outputting a chirp in a short period. The 3D image generation apparatus 10 may acquire a high resolution image at a high scan rate by increasing the count of the chirp output when the chirp has a shorter length.

The 3D image generation apparatus 10 may perform imaging at a low scan rate on a far-field object by increasing a transmission period of the chirp. In addition, the 3D image generation apparatus 10 may perform imaging at a high scan rate on a fast moving near-field object by shortening a transmission period of the chirp.

An ultrasonic signal emitted from a bat is frequency chirped over a wide frequency range, which can play an important role in recognizing the shape of an object from an echo spectrum. Accordingly, the 3D image generation apparatus 10 may chirp the emitted ultrasonic signal from 20 kHz to 120 kHz, as shown in FIG. 2.

The 3D image generation apparatus 10 may have superior performance compared to the conventional iterative reconstruction method by applying an artificial neural network. In particular, the 3D image generation apparatus 10 can significantly reduce inference time, compared to the conventional iterative reconstruction method.

The 3D image generation apparatus 10 may generate a 3D image by effectively solving echolocation problem using an artificial neural network that emulates a neural network of a living bat.

The 3D image generation apparatus 10 may reconstruct a 3D image from collected ultrasonic data by using a feed-forward neural network.

As for a bat, the collected signals or the detected signals may be converted to an image through a neural interaction between nuclei and an auditory cortex (AC) on the central auditory pathway (through a brainstem and a midbrain).

The auditory nuclei of the bat may extract temporal features and spectrum features required for the echolocation from the received signal.

The auditory nuclei of the bat may deliver the extracted features to the AC via monaural, binaural, ipsilateral and contralateral connections.

The 3D image generation apparatus 10 may generate a 3D image by emulating the anatomical auditory pathway of the bat. Through this, the 3D image generation apparatus 10 may not only have high sensing performance in bad weather condition but also perform high resolution imaging over a relatively long distance.

The 3D image generation apparatus 10 may achieve an accuracy of Lidar level by using a frequency-modulated chirp (20 kHz to 120 kHz). The 3D image generation apparatus 10 may provide an ultrasonic imaging system that can obtain distance information as well as high horizontal and vertical resolutions, by using the transmitter 100 which outputs a signal from at least one point and the receiver 200 which receives at one or more points.

In the case of Lidar, 3D image reconstruction is performed by generating a point cloud by outputting a large number of pulses. On the other hand, the 3D image generation apparatus 10 estimates an echo pattern of a frequency-modulated chirp via Deep-learning network and then can reconstruct a 3D image with a single pulse.

The 3D image generation apparatus 10 may complement other conventional sensors under a condition that the light is insufficient, such as bad weather conditions.

The 3D image generation apparatus 10 may use a signal similar to a frequency-modulated chirp signal of the bat. The signal emitted from the transmitter 100 is reflected on the object and then returns. The returned echo signal may be received with adjusted by a unique pattern according to the shape of the object.

The bat analyzes such various patterns and takes actions such as avoiding obstacles, hunting for food, or the like. The 3D image generation apparatus 10 can make a 3D image by using an imaging sensor which can transmit and receive wide-band chirp signals and an artificial neural network which can learn various echo patterns according to the shapes of the objects.

As described above, the 3D image generation apparatus 10 may include a speaker for transmitting an ultrasonic wave in 20 kHz to 120 kHz band, a microphone for receiving a reflected ultrasonic wave, and a processor for processing the received signal by the microphone.

The 3D image generation apparatus 10 may perform high resolution 3D ultrasound imaging through an artificial neural network that emulates an auditory neural network of a bat capable of processing echo patterns.

The 3D image generation apparatus 10 may process the received signal by highly improving a resolution on either frequency information or time information, in considering that the auditory neural network of the bat includes separate neurons having high sensitivity for frequency component or for time component.

In addition, the 3D image generation apparatus 10 may establish a receptive field suitable for the characteristics of the received high resolution input signal by using a deformable convolution.

The auditory neural network of the bat may monaurally or binaurally process the signals received by the left ear and right ear, and sequentially process the features required for object shape reconstruction by delivering the processed signal to a later stage.

The 3D image generation apparatus 10 may process a signal received in four channels via an artificial neural network emulating the auditory system of the bat, by single channel-wise or two channel-wise.

The 3D image generation apparatus 10 may extract the temporal features and spectral features from the signal reflected on the object, and may reconstruct a 3D image by processing the extracted features.

Figure 3:
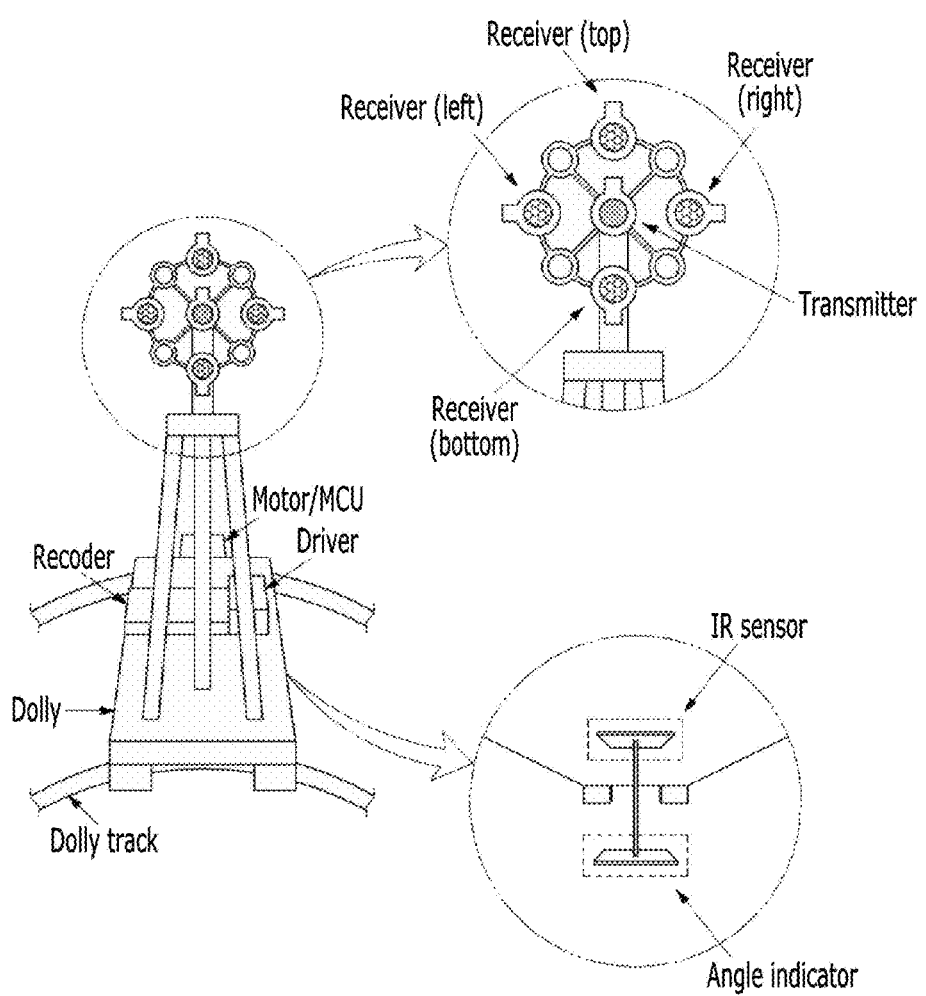
FIG. 3 shows an example of a hardware implementation of the 3D image generation apparatus shown in FIG. 1.

FIG. 3 shows an example of a hardware implementation of the 3D image generation apparatus shown in FIG. 1

Referring to FIG. 3, a transmitter 100 may emit a broadband frequency-modulated signal, and a receiver 200 may receive (or record) an echo reflected from the object.

As described above, the transmitter 100 may include one speaker or a plurality of speakers, and the receiver 200 may include one microphone or a plurality of microphones.

The processor 300 may transform a signal from the receiver 200 into a spectrogram, input the spectrogram into an artificial neural network for training, and as a result infer a 3D image of the object.

In order to train the artificial neural network, the processor 300 may use a supervised learning algorithm, and an ECHO-4CH which is a dataset of a signal having a plurality of channels (for example, 4-channel ultrasonic echo).

Each echo data may include a plurality of spectrograms (e.g., eight 256×256 grayscale images) and one 3D ground-truth label (e.g., 64×64×64 voxels).

The bat can use a hyperbolic frequency-modulated chirp containing multi harmonics.

Multi harmonics can have an effect of pulse compression that increases the spatial resolution as well as the receive sensitivity.

Compared to linear FM chirp, the hyperbolic FM chirp may be less sensitive to a frequency shift caused by the movement of the object due to Doppler tolerance. Therefore, the 3D image generation apparatus 10 may use the hyperbolic FM chirp as an output signal.

The emission power of the hyperbolic FM chirp may be distributed over a plurality of harmonic frequencies at a given time. As described above, the transmitter 100 may include a speaker and the emission power of the speaker may lower than that of the bat by about 30 dB. The 3D image generation apparatus 10 may use a single harmonic structure during data acquisition to increase a signal-to-noise ratio (SNR).

The 3D image generation apparatus 10 may use an automatic echo scanner as described above. The supervised learning may require a sufficient amount of training data.

It can be difficult for a person to measure a single object or multiple objects in various locations. Since the accuracy may be deteriorated when the measurement is performed by a person, the transmitter 100 and the receiver 200 may have a structure of an automatic echo scanner including a four-wheeled dolly and a circular dolly track as shown in FIG. 3. However, the structure of the 3D image generation apparatus 10 is not limited thereto. According to embodiments, the structure of the transmitter 100 and the receiver 200 may be changed.

In the embodiment shown in FIG. 3, an angle indicator may be installed at an interval of 10 degree interval between the rails. The angle indicator may be identified by an infrared photo interrupter sensor and be installed at the bottom of the dolly.

A microcontroller unit (MCU) may be used to move the dolly at the interval of 10 degree and to sense data while controlling the motor speed. In addition, the transceiver may be mounted on a tripod as shown in FIG. 3.

To extract sufficient spatial information required for 3D echolocation, the receiver 200 may be implemented with a plurality of microphones. For example, the receiver 200 may be implemented with four ultrasonic microphones.

In the embodiment shown in FIG. 3, the transmitter 200 may be implemented as an ultrasonic speaker and placed at the center of a sensing module. The transmitter 200 may output an ultrasonic chirp in the frequency range of 20 kHz to 120 kHz, with a maximum power of 78 dB Sound Pressure Level (SPL) at 1 meter.

The speaker may be driven by a class AB speaker driver with a maximum power of 10 W. Four condenser ultrasonic microphones may be placed at the right, left, top and bottom of the speaker, respectively, and may be separated from each other by 6 cm.

The microphone may have a broad and flat frequency response in the range of 20 kHz to 150 kHz and may have an attenuation of −6 dB or less. The recorder may amplify the signal received from the microphone with a maximum gain of 40 dB and digitize the signal received from the microphone at a sampling rate of 750 kSample/s.

Figure 4A:
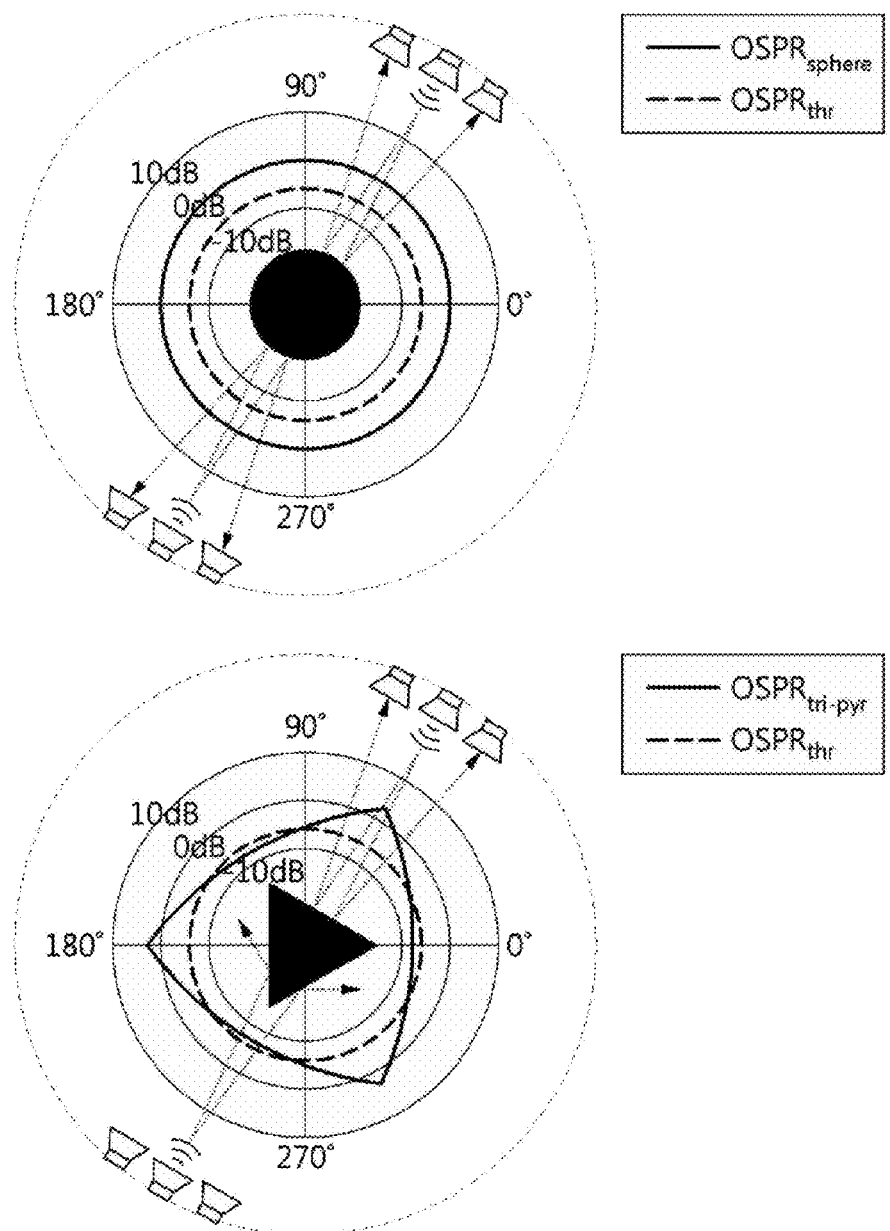
FIG. 4A shows an example of characteristics of the signal reflected on the object.
Figure 4B:
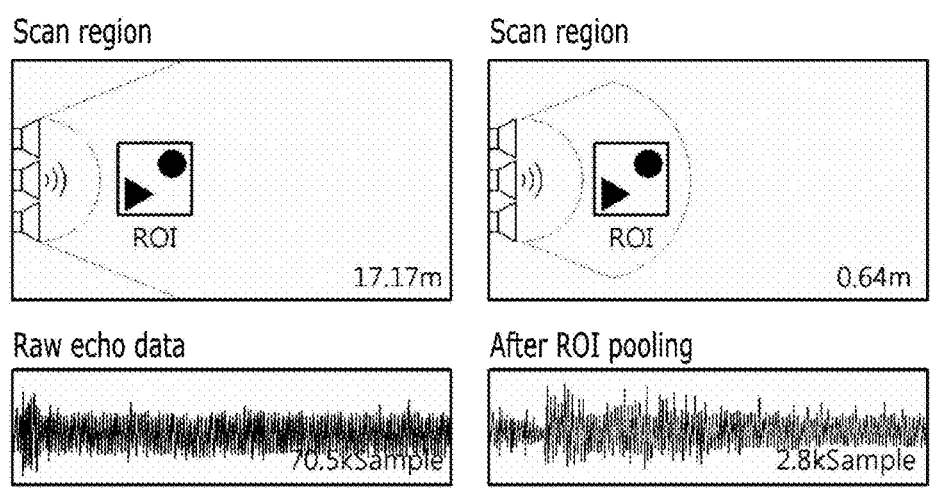
FIG. 4B shows another example of characteristics of the signal reflected on the object.
Figure 4C:
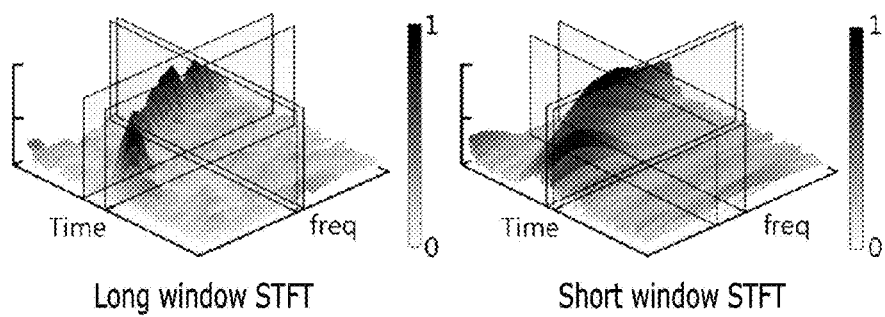
FIG. 4C shows an example of converting an echo signal into two spectrograms.
Figure 4D:
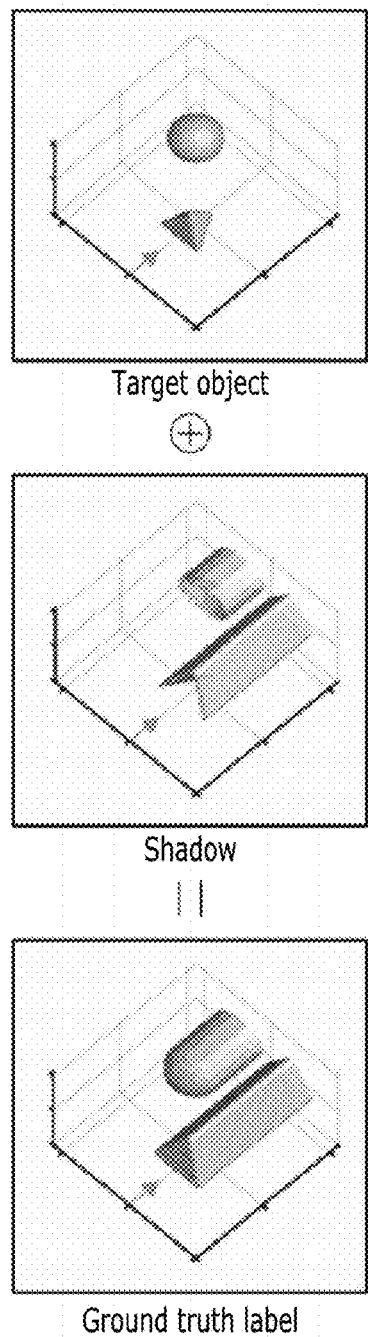
FIG. 4D shows an example of a ground-truth label using shadow padding

FIG. 4A and FIG. 4B show examples of characteristics of the signal reflected by the object, FIG. 4C shows an example of converting an echo signal into two spectrograms, and FIG. 4D shows an example of a ground-truth label using shadow padding.

Referring to FIG. 4A to FIG. 4D, the processor 300 may perform preprocessing on the signal received from the receiver 200. The object may return only a limited portion of ultrasonic energy to the receiver 200. In Radio Detection and Ranging/Sound Navigation and Ranging (RADAR/SO- NAR), the backscattered power Pr received by the microphone may be represented by Equation 1.

$$P_r = \frac{P_t G_t A_r \sigma e^{-2\alpha R}}{(4\pi)^2 R^4} \quad \text{[Equation 1]}$$

Here, Pt is a transmitted power of the speaker, and $G_t$ is a gain of the speaker. $A_r$ is an effective area of a microphone, and a is a sonar cross section (SCS). $\alpha$ is an atmospheric attenuation constant, and R is a distance from a speaker/microphone to an object.

The SCS may depend on the geometric shape of the object and the direction of the ultrasonic source. If the object has a small SCS (e.g., when most of a reflection surface of an object causes specular reflection), an SNR of the received signal may drop below the minimum detectable threshold SNR as shown in FIG. 4A.

The artificial neural network may be required to be trained with a reliable dataset. To this end, the Object-to-Sphere Power Ratio (OSPR) of the dataset may be greater than −6 dB. The OSPR may be a ratio between the received power of the object and that of an isotropic sphere (e.g., a sphere with a radius of 9 cm). The example shown in FIG. 4A may represent polar plots of OSPR of a sphere and a triangular pyramid.

The 70.5 k sample data recorded by the receiver 200 can cover a scan depth of 17.17 m (the speed of sound c=343.42 m/s). Processing raw data may require large computational power and sufficient amount of Graphics Processing Unit/Random Access Memory (GPU/RAM).

In order to reduce the input dimensionality, preliminary information that the object is located at a distance of 1.48 m±32 cm is considered and only 2.8 k sample data covering a region-of-interest (ROI) can be used. Thereby, the input dimension can be reduced by 98%. FIG. 4B shows an example of ROI pooling of a signal reflected by the object.

The bat has superior Cochlear Nuclear (hereinafter referred to as "CN") compared to other kind of mammals. The CN of a bat is seamlessly connected to sense organs and receives auditory signals accurately with a short delay. Thereby, the temporal hyperacuity required for the echolocation can be maintained.

The CN complex may include two cranial nerve nuclei of a ventral cochlear nucleus (VCN) and a dorsal cochlear nucleus (DCN). Cells of the VCN may play an important role in extracting timing information from auditory nerves, and may include a bushy cell and an octopus cell.

Meanwhile, principal neurons of the DCN including a fusiform cell may perform nonlinear spectral analysis considering the locations of head and ears.

As the VCN and the DCN perform a temporal analysis and a spectral analysis, as shown in FIG. 4C, the processor 300 may convert the received signal into two spectrograms having high resolutions on time and spectrum by using a short-time Fourier transform (STFT) based on a short window (33 us sized window with 20 us overlap) and a long window (133 us sized window with 90 us overlap), respectively.

Since the two spectrograms are different in size, the processor 300 may adjust them to the size of 256×256.

After the echolocation measurement setup, a 3D CAD model of a plurality of target objects may be placed in a virtual ROI space with dimensions of 64×64×64 size (voxel size 1×1×1 cm³). Since an acoustic reflection coefficient at the interface between air and a solid object is close to 1, field of view (FoV) of the microphone may be limited to the front surface of the object. Therefore, as shown in FIG. 4D, a shaded region from a back surface to an end of the ROI may be padded.

Figure 5A:
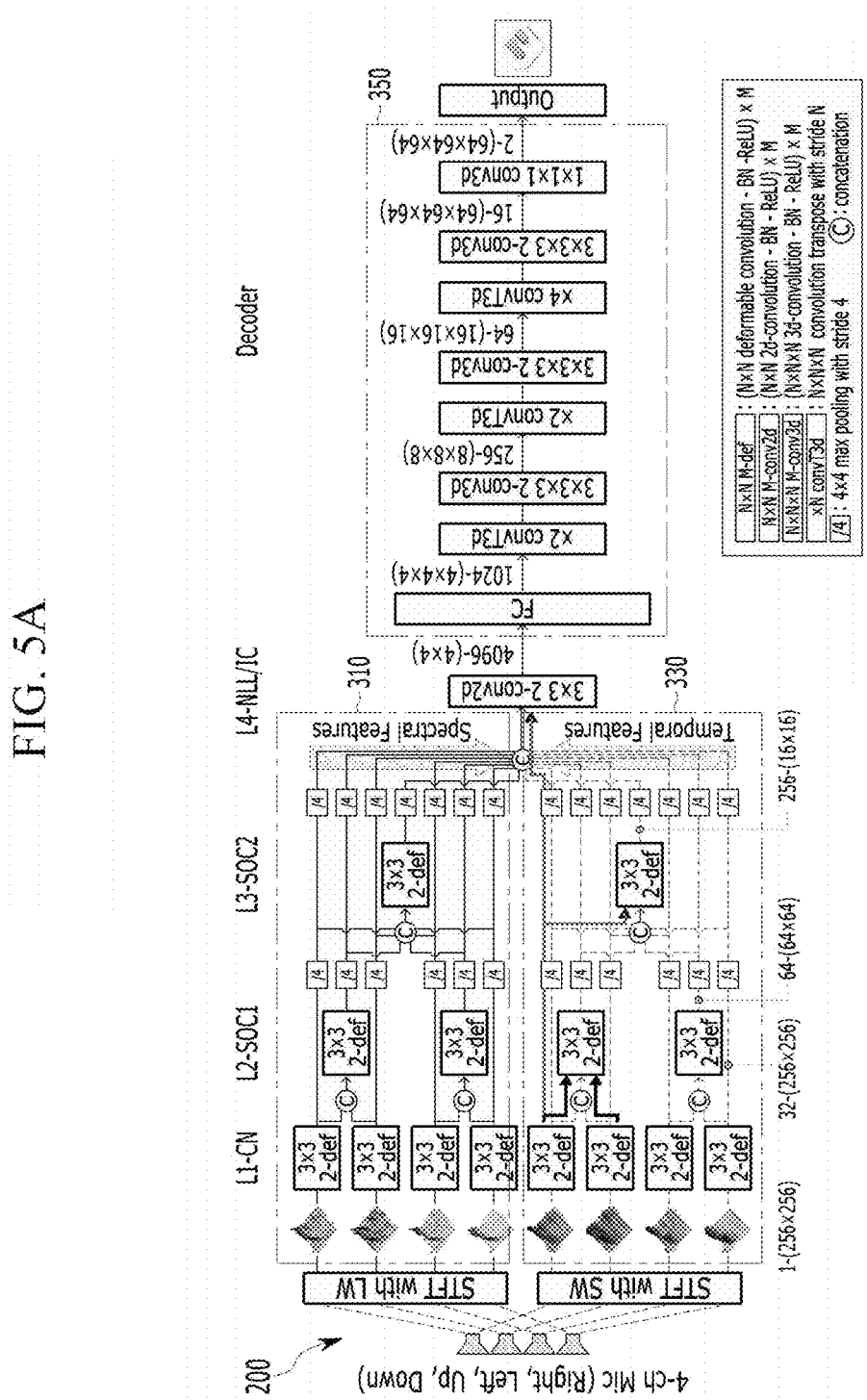
FIG. 5A shows a structure of an artificial neural network used by the 3D image generation apparatus shown in FIG. 1.
Figure 5B:
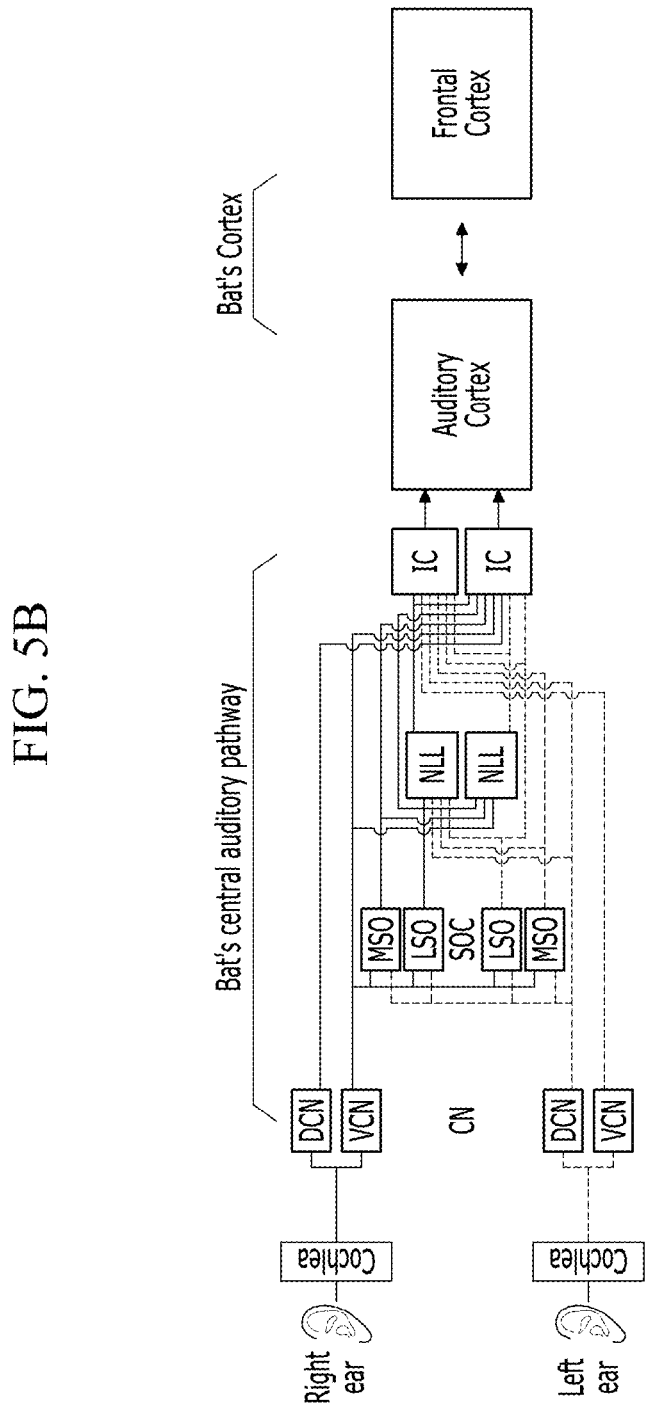
FIG. 5B shows a simplified auditory system of the bat.

FIG. 5A shows a structure of an artificial neural network used by the 3D image generation apparatus shown in FIG. 1, and FIG. 5B shows a simplified auditory system of the bat.

Referring to FIG. 5A, the processor 300 may generate a 3D image by processing a signal reflected by the object by using an artificial neural network including at least one subnetwork. For example, the artificial neural network may include a first encoding network 310, a second encoding network 330, and a decoding network 350.

The processor 300 may extract a plurality of spectral feature maps by performing at least one convolution operation on a first spectrogram via the first encoding network 310. The processor 300 may extract a plurality of temporal feature maps by performing at least one convolution operation on a second spectrogram via the second encoding network 330.

The processor 300 may generate a 3D image of the object through analyzing four-channel ultrasound echoes by using an artificial neural network including the first encoding network 310, the second encoding network 330, and the decoding network 350.

The artificial neural network may include two types of subnetworks. One may be an encoding network (such as the encoding network 310, 330) that emulates a central auditory pathway of a bat, and the other may be a decoding network (such as the decoding network 350) that performs 3D rendering.

A 3D perception mechanism of a frequency-modulated bat may include an interaction between an auditory pathway (through a brainstem and a midbrain) and an auditory cortex (AC). FIG. 5B shows a simplified auditory system of the bat.

Referring to FIG. 5B, the auditory system of the bat may be composed of four main blocks. The first may be a CN that extracts temporal-spectral information from an activation pattern of auditory nerve fibers where the ipsilateral cochlear nerves are distributed. The CN may include a dorsal cochlear nucleus (DCN) and a ventral cochlear nucleus (VCN).

The second may be a superior olivary complex (SOC) (a medial superior olive (MSO) and a lateral superior olive (LSO)) that calculate a difference in times and a difference in intensities of the two ears that contribute to a sound source localization.

The third may be a nucleus of the lateral lemniscus (NLL) and an inferior colliculus (IC) where an auditory nerve and auditory information organized from a peripheral brainstem nuclei converge. The fourth may be an auditory cortex (AC) and a prefrontal cortex (PFC) that convert integrated auditory characteristics to a unified 3D image.

Neurons sensitive to temporal domain information or spectral domain information may configure a nucleus that is a cluster of neurons. Each nucleus may intensively extract domain-specific features according to the characteristics of the neurons constituting the cluster.

The processor 300 may use a convolution layer of which the size of the receptive field is variable according to a pattern of a temporal cue and a spectral cue in the encoding networks 310 and 330. For example, the convolution of which the size of the receptive field is variable may include a deformable convolution.

In addition, the network may be divided into two paths that dominantly process the temporal cue and the spectral cue of an input spectrogram, respectively. The two paths may be the first encoding network 310 and the second encoding network 330, respectively.

As described above, the nuclei may directly or indirectly receive a monaural signal, a binaural signal, an ipsilateral signal and a contralateral signal from the lower auditory nuclei.

In the embodiment shown in FIG. 5A, the receiver 200 may receive signals reflected by an object at four points (e.g., right, left, top, bottom).

The processor 300 may generate an ultrasonic echo spectrogram based on a short window or a long window, and may monaurally process the generated echo spectrogram through a neural network layer corresponding to L1-CN shown in FIG. 5A.

The processor 300 may binaurally concatenate output feature maps of L1-CN, L2-SOC1, or L3-SOC2 shown in FIG. 5A), and input the binaurally concatenated feature maps into the decoding network 350.

The processor 300 may simultaneously transmit the feature maps to a deeper layer by at least one level via at least one 4×4 max pooling layer with successive stride-4.

The processor 300 may integrate all outputs of the layers in L4-NLL/IC and output the integrated result (a 4×4 dimension vector with 4096 feature maps) to a 3D visualization decoding network 350.

The first three layers (L1-CN, L2-SOC1, and L3-SOC2) of the first encoding network 310 and the second encoding network 330 may include a 3×3 deformable convolution (dilation factor of 1, 3×3 offset, and "same" padding), a following batch normalization (BN), and a rectified linear unit (ReLU) activation.

L4-NLL/IC may include successive two convolutions (3×3 kernels, "same" padding with BN and ReLU). The padding may be an operation of filling the periphery of the input feature map with arbitrary values. The "same" padding may include a zero padding that filling with 0s to make the size of the input feature map and that of the output feature map same.

The decoding network 350 may be implemented as a 3D inverse rendering decoder, and project the output data of the encoding networks 310 and 330 in a low dimensional manifold into a volumetric 3D image in a 64×64×64 vector space.

A fully-connected (FC) layer applied to 4×4 pixel inputs encoded with 4096 feature maps may have 4096 hidden units. The output of the FC layer may be reshaped into a 3D vector domain (a 4×4×4 vector with 1024 feature maps).

A 3D vector may pass through three 3D convolution transpose layers which are composed of one 3D convolution transpose (or deconvolution) layer (that has stride-2 2×2×2 or stride-4 4×4×4 kernels, and performs "same" padding and ReLU) and two 3D convolution layers (that has 3×3×3 kernels, and performs "same" padding, BN and ReLU).

In order to convert a 16-feature vector into the desired representation, a 1×1×1 convolution layer may be added to a nal layer.

The processor 300 may train an artificial neural network. While training the artificial neural network, the network can learn a forward reconstruction method comprising two manifold transformations.

One of the two manifold transformations may be a differmorphism ($\Phi$ in the form of a matrix) between an input space $s \in \mathbb{R}^{8 \times 256 \times 256}$ and a latent space in a low dimension. The other may be a manifold mapping $\Psi$ from the latent space to a 3D artificial neural network output $\hat{y} \in \mathbb{R}^{64 \times 64 \times 64}$.

This may be analytically represented by using a conventional solution to an inverse transformation problem as Equation 2.

$$\hat{y}=(G^TG)^{-1}G^Ts=\Psi\Phi s \qquad \text{[Equation 2]}$$

Here, G is an operator matrix of governing equation (e.g. an acoustic wave equation).

The training objective may be to minimize the 3D reconstruction loss L between $\hat{y}$ and the ground-truth label $y \in \mathbb{R}^{64 \times 64 \times 64}$.

The loss function may be represented as Equation 3, by using an $L_2$-regularization loss (regularization strength $\lambda$ of $10^{-6}$) and a cross-entropy loss $L_{CE}$ that performs a softmax activation.

$$L(\hat{y},y)=L_{CE}(\hat{y},y)+\lambda L_2 \qquad \text{[Equation 3]}$$

The processor 300 may use an Adam optimization algorithm ($\beta 1$, $\beta 2$, and $\epsilon$ are 0.9, 0.999, and $10^{-8}$, respectively), which uses an exponential decay (a learning rate, a decay rate, and a decay step are $10^{-4}$, 0.9, and 5000, respectively) for convergence.

To reduce overtting, a dropout with a retention probability of 0.5 may be applied during training, except for the first two layers (L1-CN and L2-SOC1), the FC layer, the last 3D convolution transpose layer, and a 1×1×1 convolution layer.

The processor 300 may train the artificial neural network based on the generated dataset by performing five iterative measurements on the same object to increase the robustness of the artificial neural network to ambient noise (e.g., noise caused by electronic devices, footstep, voice, or the like).

The artificial neural network may be iteratively trained with 500 k times on a GTX 1080 Ti GPU and a Threadripper 1900xCPU.

Figure 6:
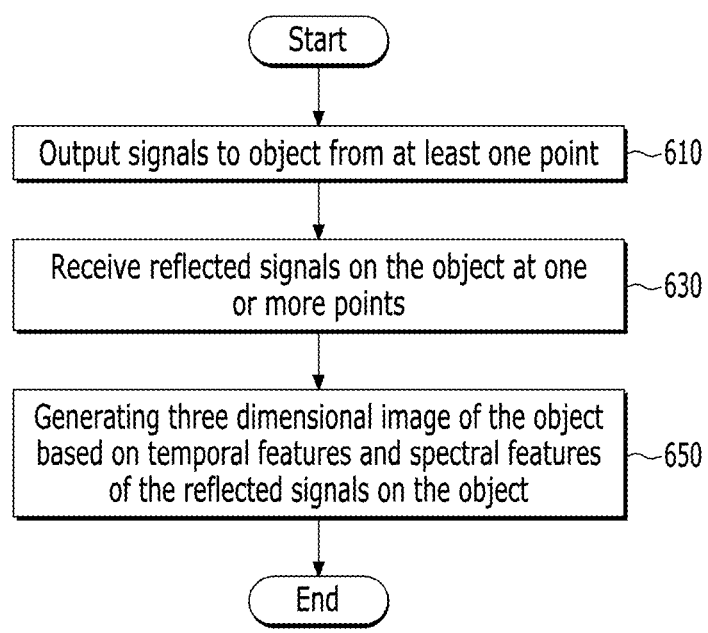
FIG. 6 shows a flowchart of the operation of the 3D generation apparatus shown in FIG. 1.

FIG. 6 shows a flowchart of the operation of the 3D generating apparatus shown in FIG. 1.

Referring to FIG. 6, the transmitter 100 may output signals to an object from at least one position (610). For example, the transmitter 100 may output an ultrasonic chirp to the object. The transmitter 100 may output an ultrasonic chirp of which at least one of a length, linearity, a number of harmonic bands, and an output period of the ultrasonic chirp is controlled.

The receiver 200 may receive the signals reflected by the object at one or more points (630).

The processor 300 may generate a 3D image of the object based on temporal features and spectral features of the signals reflected by the object (650).

The processor 300 may generate a 3D image of the object by extracting a feature map including temporal features and spectral features from the reflected signals and processing the extracted feature map. In addition, the processor 300 may generate a 3D image by generating spectrograms from the reflected signals and processing the spectrograms.

The processor 300 may generate at least one spectrogram by performing frequency conversion on the signals reflected by the object. The processor 300 may extract the feature map by processing the generated at least one spectrogram.

Specifically, the processor 300 may generate at least one spectrogram by performing Fourier transform the signals reflected by the object. The processor 300 may generate at least one spectrogram by converting the signals reflected by the object based on at least one window.

For example, the processor 300 may generate a first spectrogram by converting the signals reflected by the object based on a first window. The processor 300 may generate a second spectrogram by converting the signals reflected by the object based on a second window.

The processor 300 may extract at least one feature including temporal features and spectral features by performing at least one convolution operation on the reflected signals. Further, the processor 300 may extract a temporal feature map and a spectral feature map by processing the generated spectrograms.

For example, the processor 300 may extract a plurality of spectral feature maps by performing at least one convolution operation on the first spectrogram via the first encoding network 310. The processor 300 may extract a plurality of temporal feature maps by performing at least one convolution operation on the second spectrogram via the second encoding network 330.

The processor 300 may sample the reflected signals on which at least one convolution operation is performed. For example, the processor 300 may perform a max pooling operation on the first spectrogram on which at least one convolution operation is performed. The processor 300 may perform a max pooling operation on the second spectrogram on which at least one convolution operation is performed.

The processor 300 may combine at least one feature map. In detail, the processor 300 may concatenate at least one feature map and perform a convolution operation on the at least one concatenated feature map.

The at least one convolution operation may include a convolution operation of which the size of a receptive field is variable. For example, the at least one convolution operation may include a deformable convolution operation.

The processor 300 may generate a 3D image of the object by processing the extracted temporal feature map and spectral feature map. The processor 300 may generate a vector by converting the feature map. The processor 300 may generate a 3D image by performing at least one convolution operation on the vector.

FIG. 7A to FIG. 7D shows examples of the 3D image generated by the 3D image generation apparatus shown in FIG. 1.

Referring to FIG. 7A to FIG. 7D, the performance of the artificial neural network may be evaluated with 2554 test data of the ECHO-4CH dataset.

FIG. 7A to 7D may show measured objects, ground-truth labels, and 3D images (or reconstruction results) generated by the 3D image generation apparatus 10.

Figure 7A:
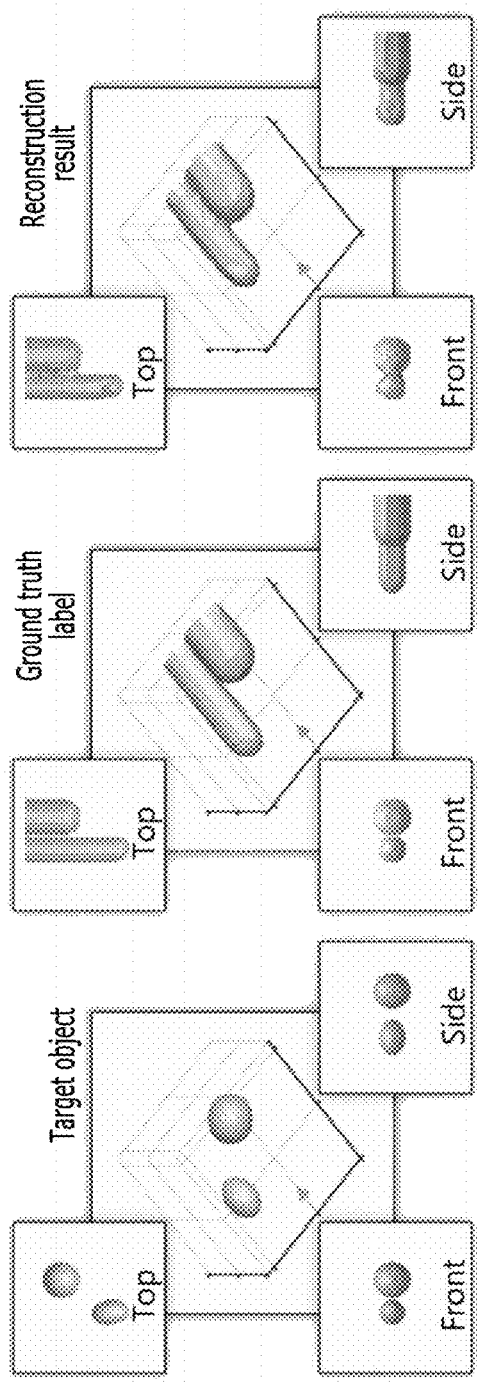
FIG. 7A shows an example of the 3D image generated by the 3D image generation apparatus shown in FIG. 1.

Referring to FIG. 7A, it can be identified that a uniform 3D image is reconstructed from an ultrasonic wave reflected by a convex surface of an object.

From the embodiment shown in FIG. 7A, it can be seen that the 3D image generation apparatus 10 can localize the measured object in a 3D space and effectively reconstruct the shape of the object by performing inference based on test data.

Figure 7B:
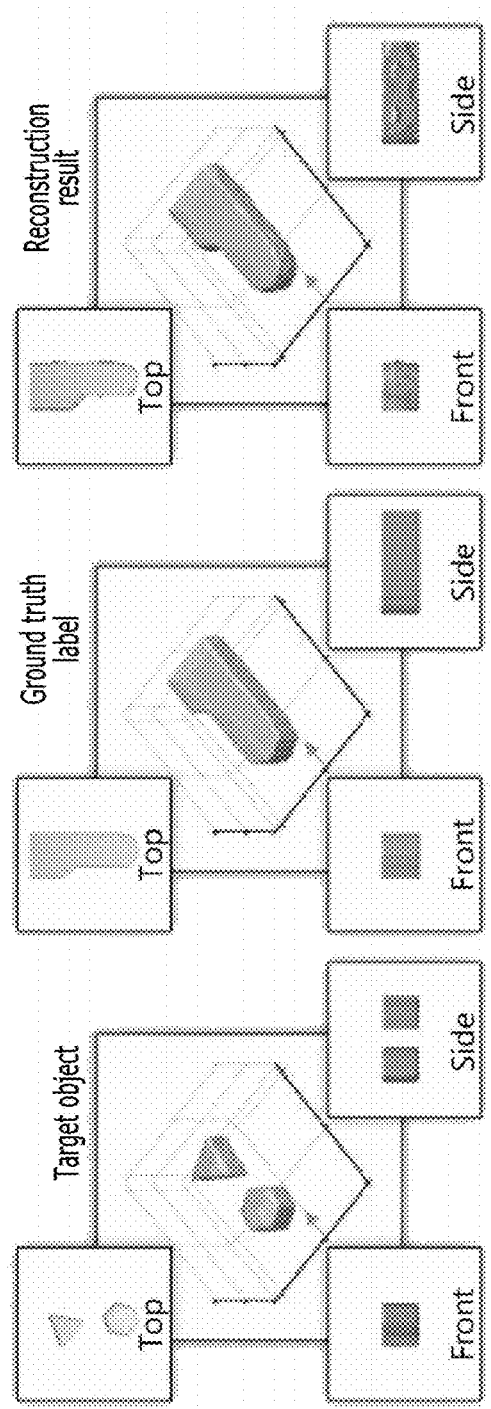
FIG. 7B shows another example of the 3D image generated by the 3D image generation apparatus shown in FIG. 1.
Figure 7C:
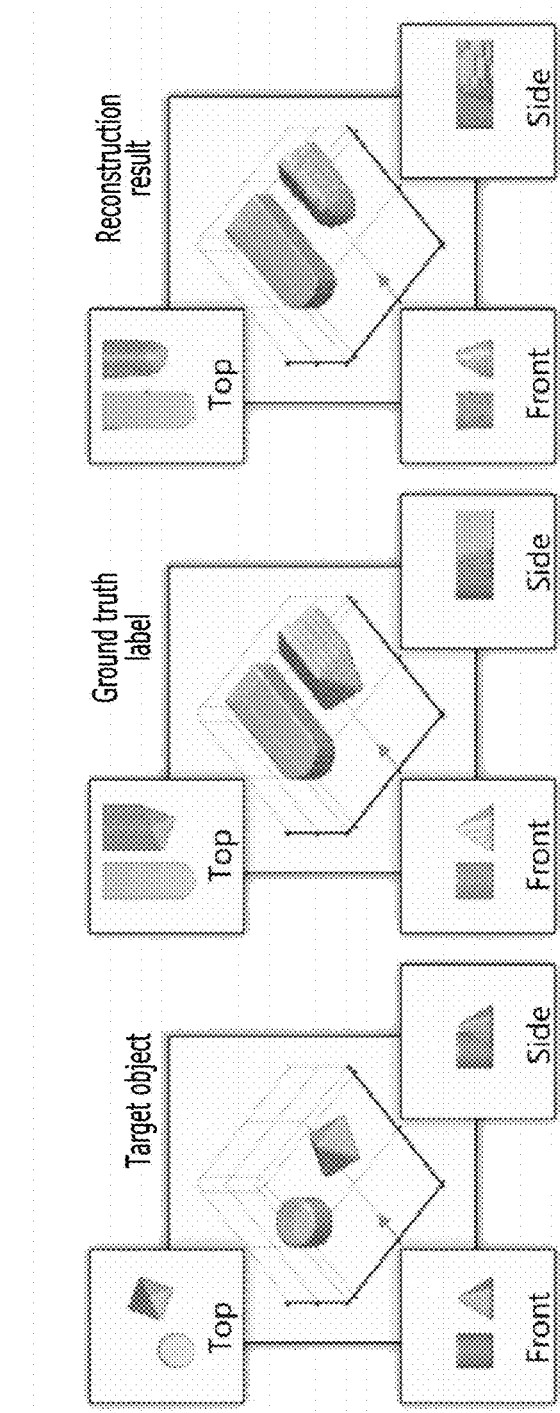
FIG. 7C shows still another example of the 3D image generated by the 3D image generation apparatus shown in FIG. 1.

Referring to FIGS. 7B and 7C, it can be understood that the 3D image generation apparatus 10 can effectively reconstruct two objects closely placed from each other and a 3D shape of an object having vertexes.

FIG. 7A to 7D show that the 3D image generation apparatus 10 act sensitively to both of azimuth cue and elevation cue.

Figure 7D:
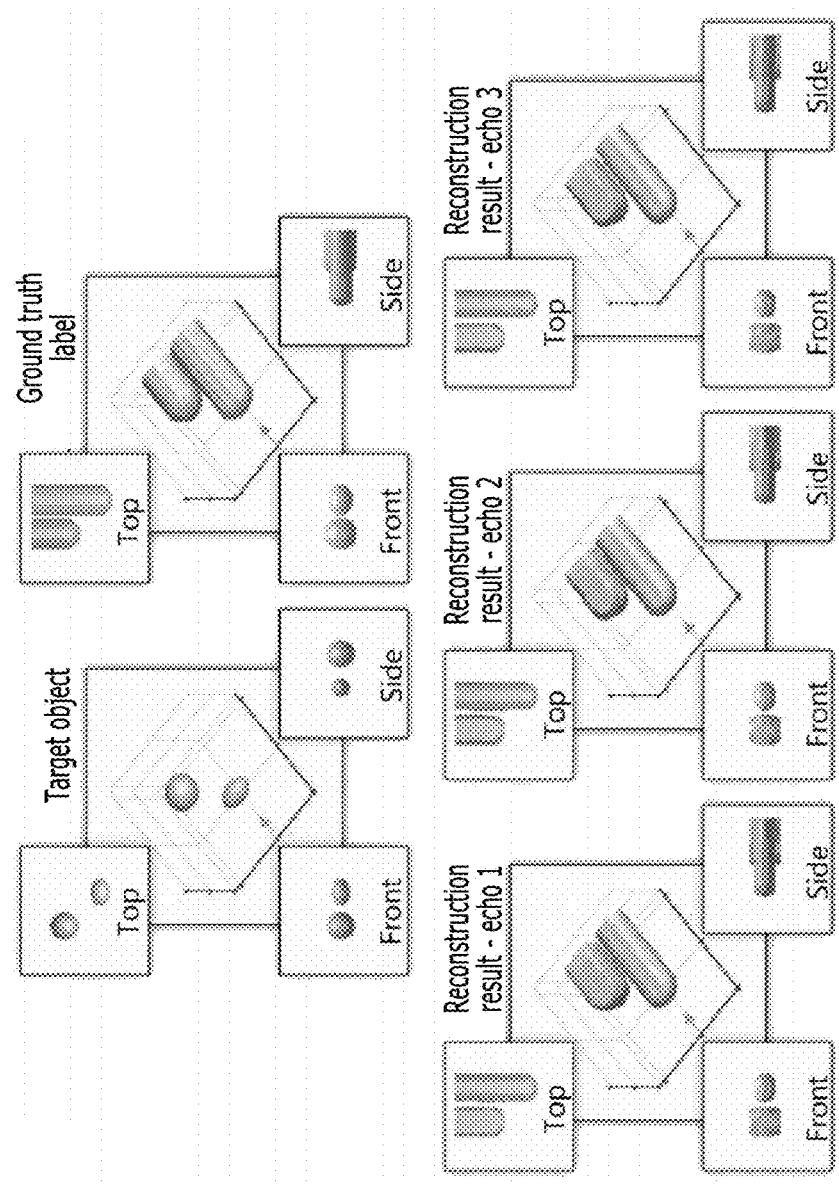
FIG. 7D shows yet another example of the 3D image generated by the 3D image generating apparatus shown in FIG. 1.

Images shown in the lower part of FIG. 7D may show the reconstruction results from three repetitive measurements of the same object. In view of the fact that the reconstructed shapes are not virtually different from each other, it can be understood that the 3D image generation apparatus 10 has reliability and robustness in the presence of ambient noise.

The performance of the 3D image generation apparatus 10 may be evaluated based on a precision, a recall, and an F1-score. Further, the performance of the 3D image generation apparatus 10 may be evaluated by changing retention probability of a dropout and a loss function.

The performance measured while changing the retention probability of the dropout can be shown in Table 1.

TABLE 1

| Retention probability in training/evaluation | Precision | Recall | F1-score |
| --- | --- | --- | --- |
| L1, L2: 0.5/1.0, Others: 0.5/1.0 | 0.885 | 0.896 | 0.887 |
| L1, L2: 1.0/1.0, Others: 0.5/1.0 | 0.896 | 0.899 | 0.895 |

The performance of the 3D image generation apparatus 10 may be evaluated for a weighted cross-entropy loss which controls the influence of the object (label 1) and the background (label 0) on a cost function. The performance may be represented as shown in Table 2.

TABLE 2

| Retention probability in training/evaluation | precision | Recall | F1-score |
| --- | --- | --- | --- |
| L1, L2: 0.5/1.0, Others: 0.5/1.0 | 0.787 | 0.960 | 0.862 |
| L1, L2: 1.0/1.0, Others: 0.5/1.0 | 0.814 | 0.964 | 0.880 |

Referring to Table 2, when the weighted loss is used, the performance increases by 7.2% in the recall but decreases by 9.2% in the precision and by 1.7% in the F1-score. Thus, it can be understood that most objects are reconstructed in blurry shapes that are slightly bigger than the ground-truth label.

To generate an accurate 3D image, a cross-entropy loss not using any weighted method may be used.

The method according to the example embodiments of the present disclosure may be implemented in the form of program instructions that can be executed by various computing devices and recorded in a computer readable medium. The computer-readable medium may include, alone or in combination with the program instructions, data files, data structures, and the like. The program instructions recorded in the medium may be those specially designed and constructed for the purposes of the embodiments, or may be well-known and available to the person of ordinary skill in the art of computer software. The computer-readable recording medium may be a magnetic medium (a hard disk, a floppy disk, or a magnetic tape), an optical media (a CD-ROM, or a DVD), a magneto-optical medium (a floptical disk), a hardware device (a ROM, a RAM, a flash memory) specifically configured to store and execute program instructions, or the like. The program instructions may be a machine language code generated by a compiler and a high-order language code that can be executed by a computer using an interpreter or the like. The hardware device may be configured to operate as one or more software modules to perform the operations of the embodiments, and vice versa.

The software may include a computer program, a code, instructions, or a combination thereof. Further, the software may configure a processing device to operate as desired or independently or collectively instruct the processing device to operate as desired. The software and/or data may be embodied permanently or temporarily in any type of a machine, a component, a physical equipment, a virtual equipment, a computer storage medium or a device, or in a propagated signal wave, in order to be interpreted by the processing device or provide instructions or data to the processing device. The software may be distributed over computer systems connected via a network and be stored or executed in a distributed manner. The software and data may be stored on one or more computer readable recording media.

While the present disclosure has been particularly illustrated and described with reference to embodiments thereof, it will be understood by the person of ordinary skill in the art that various changes in form and detail may be made therein without departing from the spirit and scope of the present disclosure as defined by the following claims. For example, a desired result may be achieved if the described techniques are performed in a different order and/or if components in a described system, architecture, device, or circuit are combined in a different manner and/or replaced or supplemented by other components or their equivalents.

What is claimed is:

1. A 3D image generation method comprising:
outputting a signal to an object from at least one point;
receiving the signal reflected by the object at one or more points; and
generating a 3D image of the object based on a temporal feature and a spectral feature of the signal reflected by the object,
wherein generating a 3D image of the object comprises:
extracting a feature map including the temporal feature and the spectral feature from the reflected signals; and
generating the 3D image of the object by processing the feature map.

2. The method of claim 1, wherein extracting a feature map comprises:
generating at least one spectrogram by producing time-frequency representation of the reflected signal; and
extracting the feature map by processing the at least one spectrogram.

3. The method of claim 2, wherein generating at least one spectrogram comprises
generating at least one spectrogram by converting the signal reflected by the object based on at least one window.

4. The method of claim 2, wherein generating at least one spectrogram comprises
generating the at least one spectrogram by performing Fourier transform on the signal reflected by the object.

5. The method of claim 1, wherein extracting a feature map comprises:
extracting at least one feature map including the temporal feature and the spectral feature by performing at least one convolution operation on the reflected signal; and
combining the at least one feature map.

6. The method of claim 5, wherein combining the at least one feature map comprises
concatenating the at least one feature map; and
performing a convolution operation on the concatenated at least one feature map.

7. The method of claim 5, wherein extracting the at least one feature map further comprises
sampling the reflected signal on which at least one convolution operation is performed.

8. The method of claim 5, wherein the at least one convolution operation comprises
a convolution operation of which a size of a receptive field is variable.

9. The method of claim 1, wherein generating a 3D image by processing the feature map comprises:
generating a vector by converting the feature map; and
generating the 3D image by performing at least one convolution operation on the vector.

10. The method of claim 1, wherein outputting a signal to an object from at least one point comprises
outputting an ultrasonic chirp to the object.

11. The method of claim 10, outputting the ultrasonic chirp comprises
outputting the ultrasonic chirp by controlling at least one of a length, linearity, a number of harmonic bands, and an output period of the ultrasonic chirp.

12. A 3D image generation apparatus comprising:
a transmitter that outputs a signal to an object from at least one point;
a receiver that receives the signal reflected by the object at one or more points; and
a processor that generates a 3D image of the object based on a temporal feature and a spectral feature of the signal reflected by the object,
wherein the processor is configured to
extract a feature map including the temporal feature and the spectral feature from the reflected signal, and generate the 3D image of the object by processing the feature map.

13. The 3D image generation apparatus of claim 12, wherein the processor is configured to
generate at least one spectrogram by producing time-frequency representation of the reflected signal, and extract the feature map by processing the at least one spectrogram.

14. The 3D image generation apparatus of claim 13, wherein the processor is configured to
generate at least one spectrogram by converting the signal reflected by the object based on at least one window.

15. The 3D image generation apparatus of claim 13, wherein the processor is configured to
generate the at least one spectrogram by performing Fourier transform on the signal reflected by the object.

16. The 3D image generation apparatus of claim 12, wherein the processor is configured to
extract at least one feature map including the temporal feature and the spectral feature by performing at least one convolution operations on the reflected signal, and combine the at least one feature map.

17. The 3D image generation apparatus of claim 16, wherein the processor is configured to
concatenate the at least one feature map, and perform a convolution operation on the at least one concatenated feature map.

18. The 3D image generation apparatus of claim 16, wherein the processor is configured to
sample the reflected signal on which at least one convolution operation is performed.

19. The 3D image generation apparatus of claim 16, wherein the at least one convolution operation comprises
a convolution operation of which a size of a receptive field is variable.

20. The 3D image generation apparatus of claim 12, wherein the processor is configured to
generate a vector by converting the feature map, and generate the 3D image by performing at least one convolution operation on the vector.

21. The 3D image generation apparatus of claim 12, wherein the transmitter is configured to
output an ultrasonic chirp to the object.

22. The 3D image generation apparatus of claim 21, wherein the transmitter is configured to
output the ultrasonic chirp by controlling at least one of a length, linearity, a number of harmonic bands, and an output period of the ultrasonic chirp.

\* \* \* \* \*